[11] 3,597,960

| [72] | Inventors | John M. Otera |
| | | Palos Verdes Peninsula; |
| | | James R. Dowling, Monterey Park; |
| | | Rudolph V. Mendoza, Monterey Park, all of, Calif. |
| [21] | Appl. No. | 799,280 |
| [22] | Filed | Feb. 14, 1969 |
| [45] | Patented | Aug. 10, 1971 |
| [73] | Assignee | TRW Inc. |
| | | Redondo Beach, Calif. |

[54] HIGH INTENSITY MECHANICAL SHOCK TESTING MACHINE
9 Claims, 7 Drawing Figs.

[52] U.S. Cl. .................................................. 73/12, 73/71.6
[51] Int. Cl. ................................................ G01n 3/08, G01n 29/00
[50] Field of Search ........................................... 73/12, 71.5, 71.6, 95, 103, 11

[56] References Cited
UNITED STATES PATENTS

| 2,630,704 | 3/1953 | Armstrong | 73/12 |
| 2,662,392 | 12/1953 | Sullivan | 73/12 |
| 2,986,921 | 6/1961 | Apgar | 73/12 |
| 3,082,846 | 3/1963 | Jensen et al. | 188/1 |
| 3,103,116 | 9/1963 | Kohli | 73/12 |
| 3,209,580 | 10/1965 | Colby | 73/12 |
| 3,262,308 | 7/1966 | Schloss | 73/71.6 |

OTHER REFERENCES
Avco Bulletin: Shock Test Machine 10/18/63 pp. 1— 4.

*Primary Examiner*—Richard C. Queisser
*Assistant Examiner*—John Whalen
*Attorneys*—Daniel T. Anderson, Gerald Singer and Alfons Valukons ABSTRACT: A mechanical shock testing machine for shock testing an object with high intensity forces over a wide frequency spectrum. The machine includes a test platform connected to a rigid support by a pair of columns having a predetermined mechanical resonance. These columns provide a restraining force. The shock is applied by exerting a large force on an extruded piece of metal having a predetermined yield point and having a reduced central portion defining a rupture area. By applying sufficient force to the extruded metal piece until it breaks, a predetermined force of short duration is applied to the test platform. The platform now vibrates in accordance with the mechanical resonance of the system. The system may be damped by applying a damping force to the platform.

The invention herein described was made in the course of or under a contract or subcontract thereunder with the Department of the Air Force.

Patented Aug. 10, 1971

John M. Otera
James R. Dowling
Rudolph V. Mendoza
INVENTORS

BY

ATTORNEY

John M. Otera
James R. Dowling
Rudolph V. Mendoza
INVENTORS

BY

ATTORNEY

Patented Aug. 10, 1971

John M. Otera
James R. Dowling
Rudolph V. Mendoza
INVENTORS

BY

ATTORNEY

HIGH INTENSITY MECHANICAL SHOCK TESTING MACHINE

BACKGROUND OF THE INVENTION

This invention relates generally to a shock testing machines and particularly relates to a testing machine for applying a predetermined short duration, large force so as to control the frequency distribution of the shock applied to an object to be tested.

Requirements for mechanical shock testing have become orders of magnitude more severe with the advent of spacecraft. For example, certain discrete events which occur in practically all payload boosters for spacecraft induce high intensity mechanical shocks. These cause essentially high frequency, small displacements of the load. The shock levels may be as much as about 10,000 G's where one G is defined as the acceleration imparted to an object when subject to the gravitational force of the earth. The frequency spectrum of such shocks may extend to frequencies as high as 10 kHz. (kilohertz). Accordingly the specifications necessitated by this type of mechanical shock define the test in terms of a response spectrum rather than as an amplitude-time history of the applied shock.

Accordingly a shock testing machine for such a purpose must be capable of generating extremely high forces. This is necessary to achieve the high impulse acceleration which is associated with the actual shock of a payload booster, the release of a lift-off mechanism or various staging events and the like. Furthermore, the damping ratio and the frequency content of the initial shock pulse must be controllable in order to achieve a desired or predetermined spectrum shape.

To this end, various approaches have been previously suggested. Among these is a drop test which converts the energy stored in lifting a test platform to a shock impulse when the platform is dropped on a shock producing pellet or other arresting mechanisms. This generates a velocity shock having an inherent rise of 6 db. (decibels) per octave as a function of frequency when related to the response spectrum. Accordingly considerable energy exists in the low frequency region which may cause unrealistic failures of the item to be tested.

Another approach which permits great control of the frequency spectrum is an electrodynamic shaker. Such a device has been disclosed, for example, in U.S. Pat. No. 3,345,864. By means of an electronic filter, the frequency response is precisely controllable. On the other hand, while the shaker may generate as much as 75,000 force-pounds, most of the energy is dissipated in the shaker armature. Accordingly the practical upper limit of acceleration is approximately 300 G. Additionally the electrodynamic shaker requires large power amplifiers to drive the shaker table to high G levels. Such power amplifiers may requires as much as 140 to 200 kilowatts to drive the shaker to an appreciable shock level.

It has also been proposed to use actual pyrotechnics. In one device the shock impulse is induced in a barrel tester made from a battleship tank section. This is effected by detonating, for example, a flexible, linear-shaped charge secured to the structure. The components to be tested are located at truss locations having a response spectrum which is believed to closely simulate the desired test environment. Another approach is to install loose explosives in so-called "flower-pots" which are secured to the test material.

It is accordingly an object of the present invention to provide a novel mechanical shock testing machine capable of subjecting an object to be tested to an extremely high intensity, short-duration shock.

Another object of the present invention is to provide a predetermined mechanical resonance to the system consisting of a test platform and an object to be tested by an element interconnecting the test platform to a rigid support and which will provide the desired response curve.

A further object of the present invention is to provide a mechanical shock testing machine of the type discussed which permits the machine to apply an adjustable amount of damping to the test platform thereby to control the exponential decay of the mechanical vibrations.

SUMMARY OF THE INVENTION

A mechanical shock testing machine in accordance with the present invention serves the purpose of subjecting an object to high forces over a wide frequency spectrum. The machine comprises a rigid support as well as a test platform for shock testing the object. An element, such for example, as a shaped column connects the test platform to the rigid support. This shaped column has a predetermined mechanical resonance and provide restraining force upon the test platform when it is subjected to a shock. A member such as an elongated piece of metal is utilized for supplying the shock to the test platform. This extruded metal piece preferably has a reduced central portion which defines a rupture area. This member is connected to the test platform. Furthermore, it is secured to means arranged between the member and the rigid support for imparting a predetermined force to the member and hence, to the test platform when it fractures.

Additionally, there may be provided adjustable means acting on the platform for damping mechanical vibrations of the platform imparted thereto when the metallic member ruptures. This may take the force of a pair of hydraulic jacks, pressing on the platform, and controlling the exponential decay of the mechanical vibrations applied to the platform.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

DESCRIPTION OF THE PREFERRED EMBODIMENT

Figure 1:
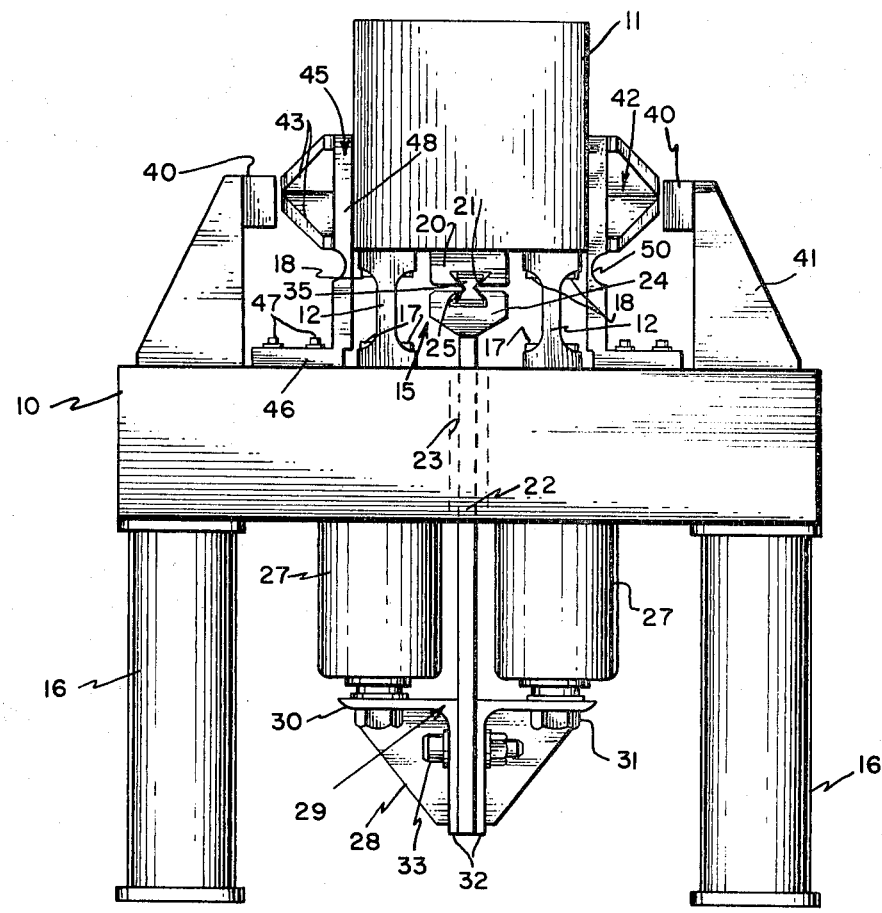
FIG. 1 is a side elevational view of a mechanical shock testing machine embodying the present invention.
Figure 2:
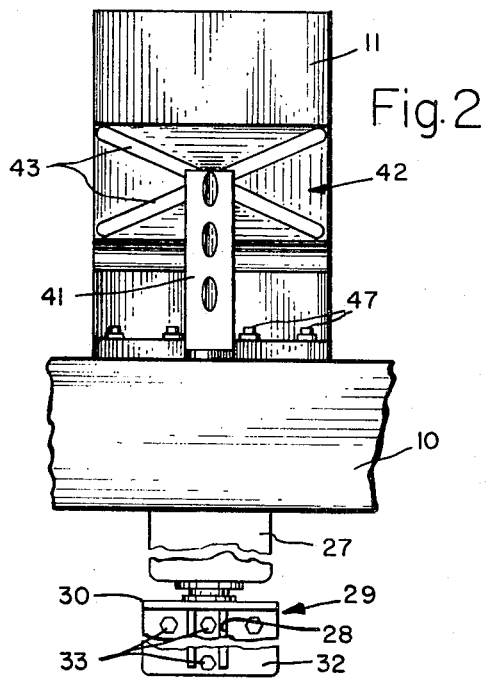
FIG. 2 is a front elevational view, parts being broken away to illustrate particularly the adjustable damping means.
Figure 3:
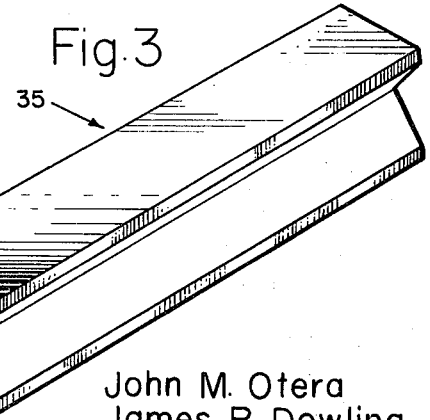
FIG. 3 is a perspective view of a metallic extrusion used for imparting a substantially instantaneous high force to the rest platform.

Referring now to the drawings, and particularly to FIGS. 1 to 3, there is illustrated a mechanical shock testing machine embodying the present invention. The testing machine generally includes a rigid support 10, a platform 11 for supporting an object to be tested, a pair of columns 12, for connecting the platform 11 to the rigid support 10 and a mechanism 15 for imparting a sudden chock of high intensity to the platform 11. The rigid support 10 may be mounted on two pairs of solid columns 16, which in turn, may be secured to the floor or preferably to a rigid, substantially vibration-free support.

Each of the two columns 12, extends along the width of the platform 11 which is shown in FIG. 2. By suitable means, such as heavy bolts 17, the columns 12 are secured to the rigid support 10 and by additional bolts 18 or other suitable means they are connected to the platform 11.

The columns 12 are preferably shaped in such a manner as to impart a predetermined mechanical resonance or frequency spectrum to the vibrating system including the columns 12 and the platform 11. To this end, the central portion of each of the columns 12 may be made of reduced cross section as shown so either have a predetermined spring constant. Since the columns 12 may be readily removed and replaced by another set of columns this permits to change the frequency characteristics of the vibrating system in accordance with any desired specifications. It is also feasible to replace the columns 12 by other mechanical means providing a restoring force to the platform, such, for example, as a set of heavy springs.

Secured to the bottom of platform 10 is an upper depending member 20 forming an upper clevis 21. A rectangular draw bar 22 extends through an opening 23 in the rigid support 10 and bears at its upper end a member 24 forming a lower clevis 25. The rectangular draw bar 22 is adapted to be pulled downwardly by a pair of hydraulic jacks 27, 27 bearing against the rigid support 10 to move downwardly two reinforced platforms 29. Each platform 29 includes a horizontal plate 30 which may be made integral with or welded to a plurality of triangular reinforcing triangular plates 28. Each plate 30 is connected to the movable portion of the two jacks 27 by a bolt 31. A pair of downwardly extending cross-plates 32 extend at right angles to both the horizontal plate 30 and the triangular members 28. The rectangular draw bar 22 is secured to the crossmembers 32 by a set of bolts 33.

The sudden mechanical shock is imparted to the platform 11 by means of an elongated member 35. This consists preferably of a material having a predetermined yield point, and it may be stressed either in shear or tension for the instantaneous release of high forces. In the embodiment shown in the drawings, the member 35 is stressed in tension. It includes an upper portion 36 which mates with the upper clevis 21 and lower portion 37 matching the shape of the lower clevis 25. Between the upper and lower portions 36, 37 there is a central portion 38 having a reduced cross section. This reduced cross section 38 defines a rupture area.

By way of example, the member 35 may, for example, be extruded or else it may be cut or sawed into the appropriate form. It may, for example, consist of an aluminum alloy known in the trade as "7075" aluminum, which is available from Alcoa and which has a tensile strength of 75,000 p.s.i. (pounds per square inch). This element may, for example, be designed in such a manner that each linear inch requires a predetermined force for fracture, such for example, as 37,500 pounds per linear inch. The entire force released upon breaking of the member 35 may readily be determined by sawing or cutting an appropriate length of the member 35 and inserting it between the upper clevis 21 and the lower clevis 25.

The force necessary to break the metal extrusion 35 is delivered by the two hydraulic jacks 27, each of which may deliver a force of 60 tons. Thus, when the jacks 27 are energized the platform 30 moves downwardly, pulling on the draw bar 22 until the metal extrusion 35 breaks.

The shock testing machine as described so far will impart a sudden, high-intensity shock to the platform 11 when the extrusion 35 breaks. Thereafter the mechanical system consisting essentially of the platform 11, the columns 12 and the object to be tested will continue to vibrate in accordance with the mechanical resonance which is determined primarily by the shape of columns 12. It should be noted again that the peak G level generated in the test platform 11 is a function of the mass of the system including the test platform and the object, and the force imparted to it by the breaking of the extrusion 35.

In order to provide even better control of the desired response of the platform over a predetermined frequency range it may be desirable to provide damping to the system. In accordance with the present invention this is accomplished by clamping the test platform 11 between a pair of hydraulic jacks 40. These are essentially disposed between the test platform 11 and the rigid support 10. To this end, an upright support 41 is made integral with or rigidly secured to the rigid support 10. Accordingly, the hydraulic jacks 40 bear against the facing surfaces of the upright platform 41.

A substantially conical structure 42 distributes the force created by the hydraulic jacks 40. Conical elements 42 may be provided with reinforcing ridges 43. A generally L-shaped, clamp support 45 has a lower horizontal portion 46 bolted to the rigid support 10 by suitable bolts 47. The upper or vertical portion 48 of the clamp support 45 bears against the test platform 11 and may be made slightly yieldable or flexible by a reduced portion disposed below the platform 11.

The hydraulic jacks 40 may exert, for example, a force of 5 tons each for clamping the test platform in caliper fashion. It is also feasible to apply suitable brake pads between the support 48 and platform 11 to modify the damping force. Alternatively the platform may be critically damped. In any case, the damping provided by the jacks 40 determines the shape of the exponential decay of the movement of the platform 11 due to the force imparted to it by the breaking of the element 35. It should be noted, however, that it is also feasible to operate the shock testing machine without any damping at all. This permits the platform 11 to oscillate or vibrate until the initial force is dissipated through heat, friction and the like. Furthermore, the damping created can be varied by varying the amount of friction between the test platform 11 and the clamp support such as 45.

The operation of the testing machine will now be apparent. Initially the hydraulic jacks 27 are contracted to raise the draw bar 22 until a suitable length of the extrusion 35 may be inserted between the upper clevis 21 and the lower clevis 25. Thereafter the hydraulic jacks 40 are actuated to supply a predetermined damping force. Then the hydraulic jacks 27 are actuated to pull down on the draw bar 22 until the extrusion 35 parts to supply the initial force to the platform 11.

Figure 5:
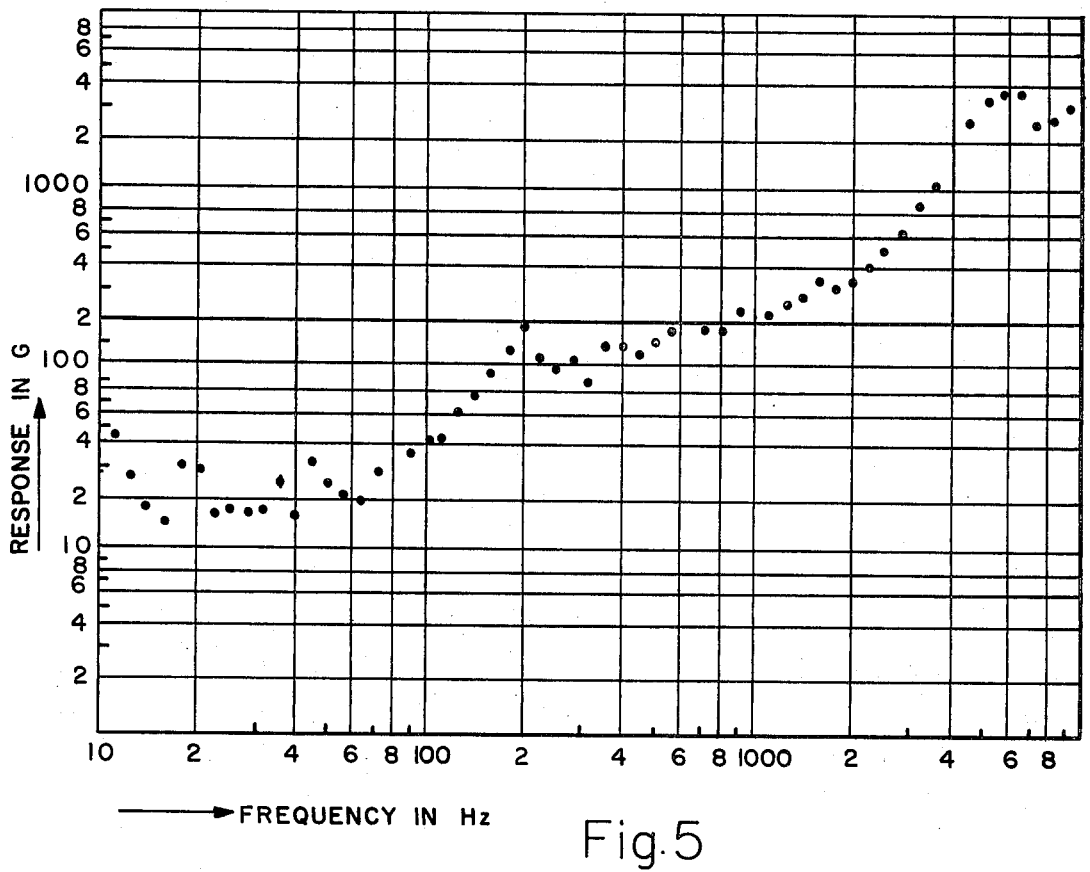
FIG. 5 is a graph showing the response in G as a function of frequency in hertz corresponding to the shock spectrum of FIG. 4.
Figure 4:
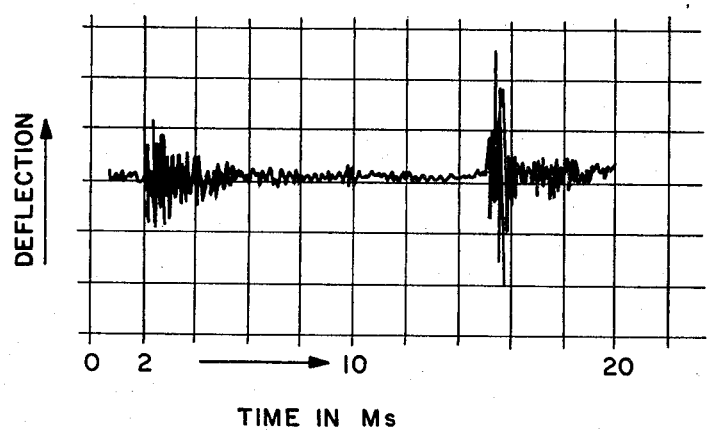
FIG. 4 is a graph showing an actual shock test where deflection is plotted as a function of time in milliseconds.

By way of example, FIG. 4 illustrates a chart which may be obtained, for example, from an oscilloscope. This shows deflection of the platform 11 as a function of time in milliseconds (MS). From the chart of FIG. 4, the chart of FIG. 5 may now be calculated. This shows the response in G's as a function of the frequency in hertz. It should be noted that the chart of FIG. 5 is a log-log chart. The frequency response extends from 10 hertz. to 10,000 hertz. The G level extends from slightly over 10 G's to almost 4,000 G's.

Figure 7:
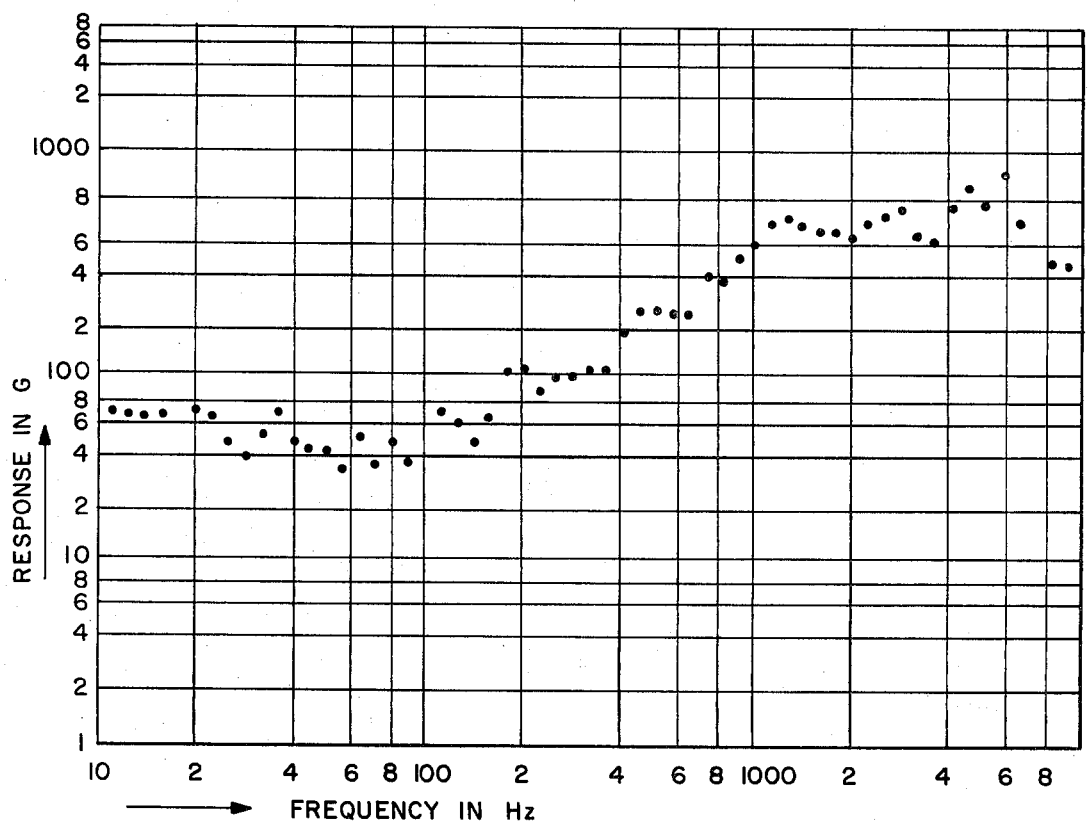
FIG. 7 is the corresponding frequency spectrum showing the response in G's as a function of frequency according to he shock spectrum of FIG. 6.
Figure 6:
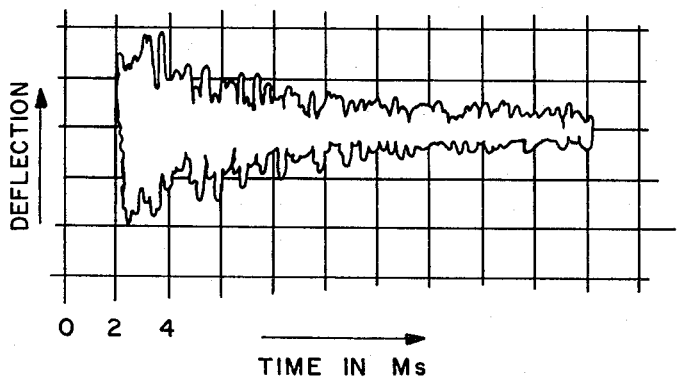
FIG. 6 is another graph of a shock test where deflection is plotted as a function of time in milliseconds.

Another frequency response obtainable with the testing machine of the invention is shown in FIGS. 6 and 7. Here FIG. 6 illustrates again the deflection as a function of time in milliseconds, which may be taken from the face of an oscilloscope. The corresponding response in G's as a function of frequency is plotted in FIG. 7. Here the frequency response again extends from 10 hertz to 10,000 hertz. The G level extends from below 40 G's to over 800 G's. The difference between the calculated curves of FIGS. 5 and 7 clearly shows the flexibility of the testing machine of the invention and the different response characteristics obtainable therewith.

There has been disclosed a mechanical shock testing machine capable of subjecting an object of very high forces over a wide frequency spectrum. Initially a high-intensity, short-duration shock is imparted to the test platform. The mechanical resonance of the vibrating system may be determined by the particular shape of a set of resonating columns. Also the exponential decay of the response is adjustable by adjusting the damping force applied to the platform. The testing machine of the invention is characterized by its simplicity and flexibility and by the fact that very high G forces are available.

What I claim is:

1. A mechanical shock testing machine for subjecting an object to high forces over a wide frequency spectrum comprising:

a. a rigid support;

b. a test platform for shock testing the object;

c. an element having a predetermined mechanical resonance for connecting said test platform to said rigid support and providing a restraining force;

d. means connectable to said platform for imparting a predetermined force of short duration to said test platform; and
e. adjustable means acting on said platform for frictionally damping mechanical vibrations of said platform imparted thereto by said means for imparting.

2. A testing machine as defined in claim 1 wherein said means for imparting a predetermined force includes an elongated member having a predetermined yield point, one portion of said member being connected to said test platform, and means connected to another portion of said member for exerting sufficient force on said member to break it, thereby to impart a predetermined force on said test platform.

3. A testing machine as defined in claim 1 wherein said element consists of at least one column having a reduced center portion for providing a predetermined mechanical frequency response to the system consisting of said test platform, said column and the object.

4. A testing machine as defined in claim 1 wherein said adjustable means consists of a pair of hydraulic jacks capable of exerting an adjustable friction force on said test platform to provide a predetermined amount of damping.

5. A mechanical shock testing machine for subjecting an object to a high force over a predetermined wide frequency spectrum comprising:
   a. a rigid support;
   b. a test platform for shock testing the object;
   c. an element having a predetermined mechanical resonance for permanently connecting said test platform to said rigid support and providing a restraining force;
   d. an elongated member having an upper and a lower portion and a reduced cross section there between and providing a predetermined yield point;
   e. means secured to said test platform for rigidly gripping the upper portion of said elongated member;
   f. further means for rigidly gripping the lower portion of said elongated member;
   g. means connected to said further means for exerting a predetermined force on said elongated member until said member breaks, thereby imparting a predetermined shock force of short duration to said platform and thereafter causing mechanical vibration of said test platform; and
   h. additional means connected between said rigid support and said platform for exerting a predetermined frictional damping force on said platform.

6. A testing machine as defined in claim 5 wherein said means connected to said further means includes a hydraulic jack connected between said rigid support and said further means.

7. A testing machine as defined in claim 5 wherein said damping means includes a pair of hydraulic jacks.

8. A testing machine as defined in claim 5 wherein said elongated member consists of an extruded metal having a predetermined yield point and having a central portion of reduced cross section along the entire length thereof which defines the rupture area, whereby the force exerted on said platform is determined by the length of said member.

9. A testing machine as defined in claim 5 wherein said element consists of a pair of columns between said rigid support and said test platform, each of said columns having a reduced central portion for providing a predetermined mechanical resonant spectrum of the system consisting of said platform, said columns and the object to be tested.

UNITED STATES PATENT OFFICE
CERTIFICATE OF CORRECTION

Patent No. 3,597,960                    Dated    November 8, 1971

Inventor(s)   John M. Otera, James R. Dowling, and Rudolph V. Mendoza

It is certified that error appears in the above-identified patent and that said Letters Patent are hereby corrected as shown below:

Column 1, line 6 after "to" --a-- should be deleted.

Column 2, line 16 after "provide" --a-- should be inserted.

line 46 "rest" should read --test--.

line 66 "chock" should read --shock--

Column 3, line 36 before "lower" the word --a-- should be inserted.

Column 4, line 11 after "portion" the number --50-- should be inserted.

line 18 "breaking" should be --braking--.

Column 6, line 27 after "columns" the word --connected-- should be inserted.

Signed and sealed this 11th day of April 1972.

(SEAL)
Attest:

EDWARD M. FLETCHER, JR.
Attesting Officer

ROBERT GOTTSCHALK
Commissioner of Patents